W. L. CLEVENGER.
DISK CULTIVATOR.
APPLICATION FILED JULY 6, 1908.
935,297. Patented Sept. 28, 1909.
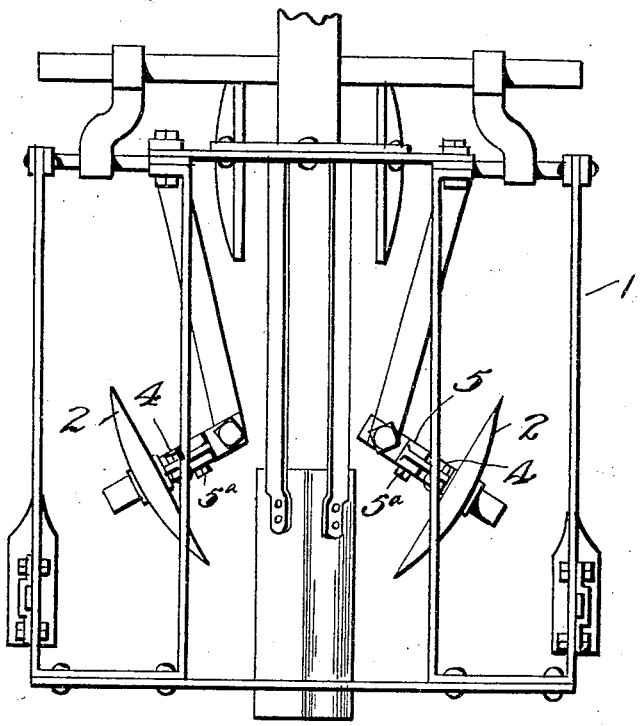
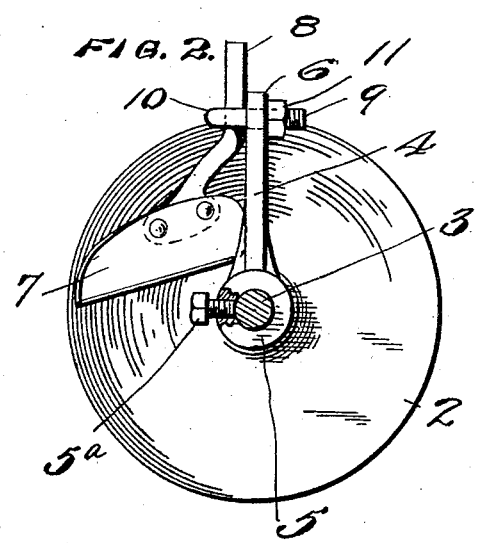
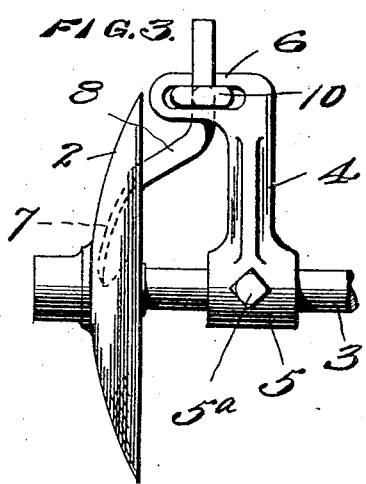
WITNESSES
Chas. K. Davies.
B. L. Miller
INVENTOR
Walter L. Clevenger
By William W. Mught
Attorney

UNITED STATES PATENT OFFICE.

WALTER LEE CLEVENGER, OF WATSON, MISSOURI.

DISK CULTIVATOR.

935,297.  Specification of Letters Patent.  Patented Sept. 28, 1909.

Application filed July 6, 1908. Serial No. 442,151.

*To all whom it may concern:*

Be it known that I, WALTER LEE CLEVENGER, a citizen of the United States, residing at Watson, in the county of Atchison and State of Missouri, have invented a new and useful Improvement in Disk Cultivators, of which the following is a specification.

My invention relates to improvements in disk cultivators, and applies more particularly to a disk scraper for use with listed corn cultivators and similar implements.

The object of the invention is the provision of a scraper which after once having been adjusted to the disk of a cultivator remains in its adjusted relation, regardless of the necessary changes made in the position of the disk as the cultivation of the soil proceeds. This end is accomplished by attaching and adjusting the scraping device to the supporting shaft of each disk; it being understood that in this class of implements the disks are usually carried on separate and independent shafts.

A further object is to provide an adjustable scraping attachment which will be effective in its work and yet avoid the objection of obstructing the passage of trash as the work proceeds.

In the accompanying drawings I have illustrated one example of the physical embodiment of the invention, constructed according to the best mode I have so far devised for the practical application of the principles.

Figure 1 is a plan view of a portion of a two-row listed corn cultivator, to the disks of which my device is attached, the view showing as much of the implement as necessary to illustrate the application of the invention. Fig. 2 is a face view of a disk showing my improved scraper attached, and Fig. 3 is an end view of Fig. 2.

As above stated the invention is shown applied to a two row listed corn cultivator, a portion of which is designated by the numeral 1 in Fig. 1. This class of implements is usually provided with two pairs of disks as 2, and my improved scraper is specially adapted for use with these disks. The disks 2 are supported in usual manner with their shafts 3 journaled in the implement frame, and are of course rotatable on their shafts.

My novel attachment consists of a bracket arm 4, formed with a sleeve 5 at one end, and a slotted angular extension 6, the sleeve being supported on a shaft 3 and secured thereto in desired position by the set screw 5ª. The scraper blade 7 has a bent shank or arm 8 secured thereto, and the shank is adjustably secured to the slotted extension 6 of the bracket by means of a bolt 9 passed through the slot in the extension. The eye 10 of the bolt receives the shank 8 which bears against the flat broad surface of the extension and is held in place by the nut 11, the flat side of the extension thus forming a wide contact face for the shank and insuring a rigid connection of the parts.

The device is capable of a wide range of adjustment both vertically and horizontally through the medium of the set screw 5ª by which the bracket may be set with relation to the disk, and the clamping device, consisting of the eye-bolt and nut in the slotted extension, permits both a vertical and horizontal adjustment of the scraper with relation to the disk; these adjustments being necessary and depending upon the character of the work required during the process of cultivation of the ground.

While I have illustrated the invention as applied to two-row corn cultivators it will be understood that the disk scraper may be applied to other similar implements where such use would be advantageous.

From the foregoing taken in connection with the drawings it is evident that I have provided an improved disk scraper which fulfils the conditions set forth as the purpose of my invention.

Having thus fully described my invention, what I claim as new and desire to secure by Letters Patent is:

The combination with a shaft and a rotatable disk thereon, a sleeve on said shaft and a set screw for adjusting said parts, a vertical bracket integral with said sleeve, a slotted horizontal extension formed on said bracket and provided with plane vertical surfaces, an eye-bolt passed through said slotted extension, a scraper formed with a shank located in said eyebolt, and a clamp-nut on said eye-bolt bearing against the surface of said extension.

WALTER LEE CLEVENGER.

Witnesses:
J. B. FREDE,
O. L. BAYLESS.